United States Patent
Bifano (10) Patent No.: US 7,929,195 B2
(45) Date of Patent: Apr. 19, 2011

(54) MEMS BASED RETROREFLECTOR

(75) Inventor: Thomas G. Bifano, Mansfield, MA (US)

(73) Assignee: Trustees of Boston University, Boston, MA (US)

( * ) Notice: Subject to any disclaimer, the term of this patent is extended or adjusted under 35 U.S.C. 154(b) by 612 days.

(21) Appl. No.: 11/791,146

(22) PCT Filed: Nov. 10, 2005

(86) PCT No.: PCT/US2005/040884
§ 371 (c)(1),
(2), (4) Date: May 18, 2007

(87) PCT Pub. No.: WO2006/086029
PCT Pub. Date: Aug. 17, 2006

(65) Prior Publication Data
US 2007/0297042 A1    Dec. 27, 2007

Related U.S. Application Data

(60) Provisional application No. 60/629,437, filed on Nov. 19, 2004, provisional application No. 60/629,533, filed on Nov. 19, 2004.

(51) Int. Cl.
*G02B 26/00* (2006.01)

(52) U.S. Cl. ........ 359/291; 359/290; 359/293; 359/295; 359/298; 359/280; 359/254

(58) Field of Classification Search .......... 359/290–295, 359/298, 318, 230, 231, 223.1, 224.1; 356/345, 356/351, 354; 310/309; 235/462.37; 427/162, 427/532
See application file for complete search history.

(56) References Cited

U.S. PATENT DOCUMENTS

| 5,471,341 | A | * | 11/1995 | Warde et al. | 359/293 |
| 5,661,591 | A | * | 8/1997 | Lin et al. | 359/290 |
| 5,903,380 | A | * | 5/1999 | Motamedi et al. | 359/224.1 |
| 6,141,139 | A | * | 10/2000 | Furlani et al. | 359/280 |
| 6,462,858 | B1 | * | 10/2002 | MacDonald et al. | 359/290 |
| 6,466,354 | B1 | * | 10/2002 | Gudeman | 359/247 |
| 6,661,561 | B2 | * | 12/2003 | Fitzpatrick et al. | 359/291 |
| 6,882,461 | B1 | * | 4/2005 | Tsai et al. | 359/290 |
| 7,034,981 | B2 | * | 4/2006 | Makigaki | 359/290 |
| 7,564,612 | B2 | * | 7/2009 | Chui | 359/290 |
| 2002/0109894 | A1 | | 8/2002 | Clark et al. | |
| 2003/0223080 | A1 | | 12/2003 | Hill | |

* cited by examiner

*Primary Examiner* — Loha Ben
(74) *Attorney, Agent, or Firm* — Weingarten, Schurgin, Gagnebin & Lebovici LLP (57) ABSTRACT

A deformable reflective surface is disclosed that may be used with a retroreflector to provide a modulated retroreflector. The modulated retroreflector may be used in communication systems such as optical laser communication systems wherein an incident beam is reflected back to the source, as modulated by the modulated retroreflector. The deformable reflective surface uniformly reflects or disperses an incident light, depending on a deformation state of the surface. The different states of the deformable reflective surface permits modulation of the reflected beam, based on an input modulation signal that can contain voice or sensor data, for example. A sensor may be used to sense the incident beam and activate the retroreflector. The deformable reflective surface may be arranged to be switched between a diffractive reflective surface and a uniform reflective surface.

26 Claims, 7 Drawing Sheets

FIG. 13

MEMS BASED RETROREFLECTOR

CROSS REFERENCE TO RELATED APPLICATIONS

The present application is based on and claims benefit of U.S. Provisional Application No. 60/629,437, filed Nov. 19, 2004, entitled MEMS Based Retroreflector and is also based on and claims benefit of U.S. Provisional Application No. 60/629,533, filed Nov. 19, 2004, entitled MEMS Based Retroreflection, a claim of priority being made to both applications.

STATEMENT REGARDING FEDERALLY SPONSORED RESEARCH OR DEVELOPMENT

N/A

BACKGROUND OF THE INVENTION

1. Field of the Invention

The present invention relates generally to retroreflectors, and relates more particularly to retroreflectors with variable reflective surface shapes.

2. Description of Related Art

Retroreflectors are used in a number of applications, such as in optical communications. Retroreflectors are useful for low power communications because of their ability to modulate an incoming light signal, for example, and return a modulated signal directly to the original source. A number of types of retroreflectors are known, including corner-cube retroreflectors, cat's eye retroreflectors, single mirror retroreflectors and lens and parabola retroreflectors. In general, retroreflectors have the property of taking in an incident beam, received from a source such as an optical or RF beam, and directing the beam back to the source through one or more reflections. Retroreflectors provide the advantage of directing a beam carrying information back to a source without the need for a transmitter at the retroreflection site. Retroreflectors can also be arranged in an array to provide a larger target, multiple channels, or other advantages.

One technique used to transmit information over a retroreflected beam is to amplitude modulate the reflected beam, or provide a multiple amplitude coding for the beam, such as is suitable for use in binary encoded communications systems. The incident beam in such a scenario is permitted to reflect back to the source or not depending on a modulation of the retroreflector device. Modulation of the retroreflective device is typically achieved by varying the reflective path in the retroreflector. For example, a reflective surface in the retroreflector is tilted to change the direction of a reflected beam, so that the reflected beam is no longer returned to the beam source.

A number of different modulation techniques are known for interrupting the retroreflective activity of a retroreflector. One type of modulator that involves mechanical displacement of a reflective surface to redirect the reflective beam uses micro-electromechanical system (MEMS) to actuate a mechanical system that causes tilting of a reflective surface to redirect the reflected beam. MEMS technology is useful for low energy, small displacement mechanical activity. Using MEMS technology, a micromechanical reflective surface can be tilted based on a modulating signal to modulate the reflection of the incoming beam to provide amplitude modulation or binary encoding of the returned beam. One drawback of this type of retroreflector arrangement is that a relatively large angular displacement is used to cause the retroreflector to reflect or not reflect the incoming beam. The relatively large angular displacement represents challenges with respect to the device geometry, energy consumed by the device, operation frequency, and other performance criteria. For example, the modulation bandwidth may be limited by the response time of the tilted reflective surface, the limitation being exacerbated by inherent response time delays of the modulation device, such as may be observed with voltage slew notes.

Other types of MEMS based retroreflective devices have been developed that can limit the tilt angle of the reflective surface used to obtain an on/off modulation of a reflective beam to a source. Such a retroreflective device is illustrated in U.S. application Ser. No. 10/661,028, now U.S. Pat. No. 7,729,030 where a reflective surface is displaced through an angular range that permits the device to switch between a reflective and transmissive mode of operation. However, the device adds additional components that complicate the structure and consume a fair amount of energy by tilting the reflective surface through an angular displacement with a MEMS type device.

Other types of retroreflective devices that can be modulated include Fabry-Perot devices that operate to transmit or reflect light depending on a configuration of parallel plates arranged at an angle to the incident light beam. However, such a device requires two or more reflective surfaces in conjunction with a retroreflector. Such a configuration can be somewhat complex and have a limited bandwidth due to device response time.

Another type of modulated retroreflector uses an optical shutter across an aperture of a normal retroreflector to permit or prevent transmission of an incident beam or retroreflected light. This type of modulated retroreflector can be somewhat expensive and represents other design challenges due to the absorption of energy when the shutter is in a non-transmissive state. As with other modulated retroreflectors described above, the optical shutter device also can have a limited bandwidth due to device component response times.

It would be desirable to obtain a retroreflector device that consumes less energy than known devices on a scale operable with MEMS type structures.

SUMMARY

In accordance with the present invention, there is provided a MEMS based retroreflector that modulates a surface geometry or shape of a reflective surface to permit a signal to be reflected back to a source or diffused or scattered depending on a modulation of the MEMS structure. The retroreflector is compact and consumes very little energy, while operating to detect and modulate an incoming signal, such as a laser beam. The reflective surface is deformed with a MEMS based electromechanical device to permit or prevent uniform or coherent reflection. The reflective surface is formed from a deformable membrane or segmented mirror that can be manipulated by a MEMS device. The reflective surface forms part of a retroreflector, such as a retroreflecting corner cube or cat's eye retroreflector.

According to an advantage of the present invention, the retroreflector device occupies two different states, one being a reflective state and another being a diffusing or scattering state. Advantageously, one of the states is maintained without consuming energy.

According to an aspect of the present invention, a deformable surface is provided as part of a retroreflector, such as a corner cube retroreflector. The deformable reflective surface is distorted through operation of a MEMS device coupled to the deformable surface. The distorted reflective surface permits a small amount of light to emerge in the zeroeth order or normal reflection of the retroreflector. The majority of the incident beam is scattered or dispersed by the deformed reflective surface in a direction different from that of an incident beam. Accordingly, in a deformed state, the deformable reflective surface returns very little energy of the beam incident to the retroreflector. In a non-deformed state, a majority of the incident light is returned to the beam source. The two different states or characteristics of the retroreflective device permits modulation of a reflected beam based on whether the deformable surface is reflecting or scattering the incident beam.

According to an embodiment of the present invention, the MEMS based retroreflector includes a MEMS device that can be actuated through thermal, magnetic, piezoelectric, magnetoresistive, capacitative or other actuation mechanisms. The MEMS device may be fabricated on a silicon wafer using conventional surface micromachine techniques and other processes common to the semiconductor industry.

According to an embodiment of the present invention, an array of MEMS type devices is provided, with each MEMS device being coupled to a reflective surface. The array of MEMS devices can be actuated in groups or individually to change the shape of the reflective surface. According to one aspect of this embodiment, the reflective surface is arranged as a flexible membrane that can be deformed through actuation of various groups or individual MEMS devices. According to another aspect of the present embodiment, one or more MEMS devices are coupled to a reflective surface that forms a part of a segmented reflective surface. Actuation of one or more of the MEMS devices causes segments of the segmented reflective surface to become out of alignment with each other, thereby interrupting a reflective path for returning a reflected beam to the source.

According to another embodiment of the present invention, each MEMS device is configured as a flexible or compliant electrode supported on one or more pedestals. The compliant or flexible electrode is arranged to be over a fixed electrode on a surface of a substrate, for example. The voltage applied between the compliant electrode and the fixed electrode causes displacement of the compliant electrode. The compliant electrode is coupled to a reflective surface, so that the reflective surface changes in shape in response to the displacement of the compliant electrode when the MEMS device is actuated.

In accordance with the present invention, a beam provided from a source is reflected back to the source when the retroreflector is operated in a first mode. The beam from the source is dispersed or scattered by the retroreflector when operated in a second mode. According to an embodiment of the present invention, the returned beam is uniform and parallel to the incident beam when the deformable reflective surface according to the present invention is set to a first, reflective shape. The returned beam is dispersed or scattered by the retroreflector being placed in a second mode, where the deformable surface is changed in shape so that the strength of a retroreflected beam that is parallel to the incident beam is greatly reduced.

According to an advantage of the present invention, a planarity of a wave front is distorted in a return beam by deforming a reflecting surface in a retroreflector. The distortion of the wave front brought about by deformation of the reflective surface uses a much smaller actuation stroke and has a faster response time than devices that redirect a plane or wave front with a tilted reflective surface. According to another advantage of the present invention, the deformable reflective surface can be made large without reducing speed parameters since individual portions of the deformable reflective surface are displaced, rather than tipping the entire reflective surface. By dividing the actuation of the modulated reflective surface across a number of actuators, faster and more effective modulation can be achieved.

According to an aspect of the present invention, the distributed actuation of a modulated reflective surface permits the production of a retroreflector with a reduced cost, low power consumption and a high modulation contrast ratio represented by the on/off intensity of the retroreflected beam. According to another embodiment of the present invention, a method for forming a modulated reflective surface is provided. The method includes depositing a patterned conductive layer on a substrate, followed by a patterned structure layer that is used to form supports for a compliant electrode deposited over the structure layer. A reflective surface support is formed over and coupled to the compliant electrode layer. The reflective surface support may be further processed to provide a flatter surface, for example, and can be overlaid with a reflective material, such as a metal, preferably gold.

In accordance with another embodiment of the present invention, a method for forming a deformable reflective surface is provided where the pliable or compliant electrode is used as the reflective surface support.

According to another embodiment of the present invention, a method for forming a deformable reflective surface is provided where a silicon substrate is used as has a uniform ground plane for electrostatic actuators. The substrate is overlaid with an insulator and a form layer, over which a conductive, compliant electrode layer is deposited. When the form layer is removed, such as by etching, the compliant electrode layer can be deflected with an applied voltage. The compliant electrodes may be formed in arrays that can be connected a voltage potential to cause the arrays of compliant electrodes to deflect. When the voltage potential is applied to the compliant electrodes, the device can operate as a diffraction degrading with a period equal to the array spacing. For example, the arrays may be arranged in rows or columns to form the diffraction grating. As with the other methods, the compliant electrode can be processed to be made flatter or more planar. A reflective material, such as a metal, preferably gold, can be deposited on top of the compliant electrode.

Where the deformable reflective surface according to the present invention is arranged as a diffractive surface, the retroreflector can be configured to have a number of channels based on return beam spread. In a non-deformed state, the deformable reflective surface returns a majority of beam energy to the source in a zeroeth order. When the reflected surface is deformed to provide a diffractive reflector, the returned beam or beams have very little energy in the zeroeth order, but provide a majority of energy in higher order modes. According to this configuration, the modulated retroreflector can provide communication on a number of channels or with redundant pickup to enhance signal-to-noise ratios, for example. The diffractive configuration can permit faster response due to enhanced signal-to-noise ratios, or greater range for the source device.

According to another embodiment of the present invention, a sensor, such as a photosensor, is coupled to a modulated retroreflector and may be used to contribute to modulation of the retroreflective beam. The sensor can be used as an on/off switch, for example, or a number of other tasks related to beam detection and retroreflective beam modulation. The sensor may also be used in a power-wakeup configuration to activate a modulated retroreflector upon detection of an incident beam.

According to another embodiment of the present invention, the retroreflective beam is modulated with an information signal to permit communication with the beam source. The modulating signal may include information relating to voice communication, data, or environmental information, for example.

BRIEF DESCRIPTION OF THE DRAWINGS

The present invention is described in greater detail below with reference to the accompanying drawings in which.

DETAILED DESCRIPTION OF THE PREFERRED EMBODIMENTS

The entire contents of U.S. Provisional Application Nos. 60/629,437 and 60/629,533 are hereby incorporated herein by reference.

Figure 1:
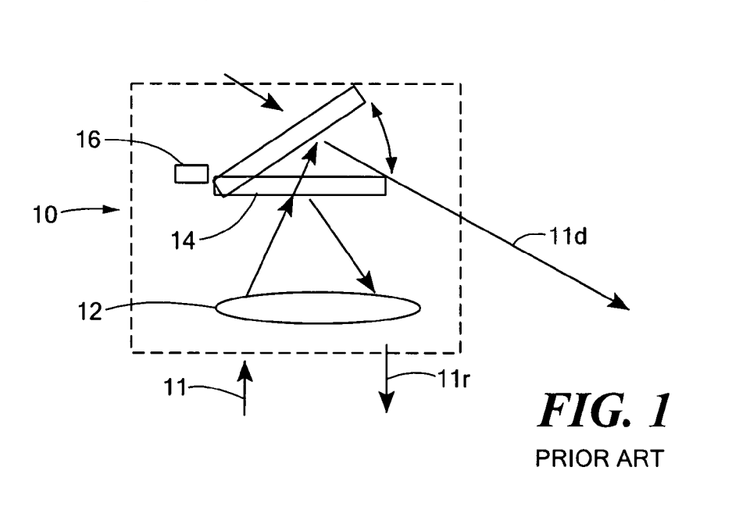
FIG. 1 is a diagram of a known modulated retroreflector device.

Referring to FIG. 1, a prior art MEMS based retroreflector device is illustrated generally as device 10. Device 10 includes a MEMS device 16 that influences a reflective member 14 to tilt or deflect in an angular displacement to direct an incoming beam 11 either to a lens 12 to produce a reflected beam 11r or in the direction represented by beam 11d, which represents a non-retroreflective beam. By positioning reflective member 14 in one of two angular states with MEMS device 16, device 10 can be modulated to provide a retroreflective beam or not to permit communication to take place between a beam source and device 10.

MEMS device 16 uses a certain amount of energy to displace reflective member 14 over an angular range. MEMS device 16 also has a finite response time in relation to displacing reflective member 14 over the angular range, leading to a limitation in the frequency at which reflective member 14 can be modulated to provide communication with a source of beam 11, for example. The configuration of device 10 is sometimes referred to as a cat's eye retroreflector, and the concept illustrated in device 10 can be applied to other retroreflectors such as corner cube retroreflectors.

Another modulated retroreflector device type can be constructed with a MEMS based grating that permits alternating portions of a reflective surface to be set to a given planar level. The grating is typically formed as stripes in a reflective surface of a retroreflector so that every other portion of the reflective surface is set in a different plane to provide modulation of the beam returned to the beam source. In these previously known types of retroreflectors, the incident beam is either returned in a direction toward the beam source, or not, depending upon the modulation of the reflective grating surface.

Figure 2:
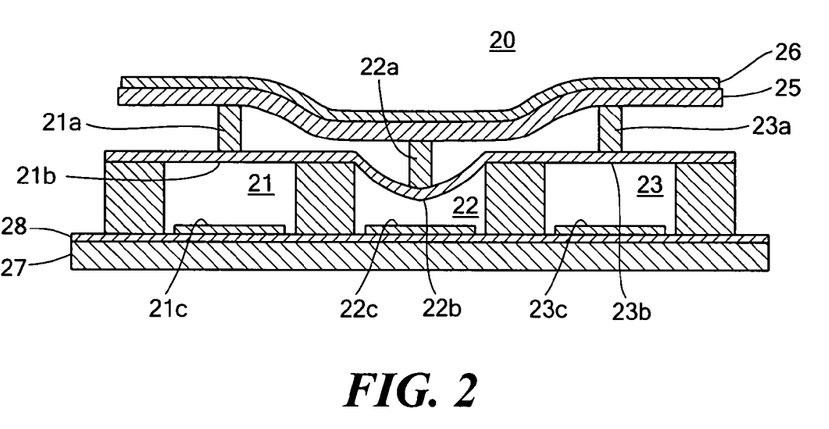
FIG. 2 is a cross-sectional side view of a deformable reflective surface according to an embodiment of the present invention.

Referring now to FIG. 2, a MEMS based deformable reflective surface for use in a retroreflector is illustrated generally as device 20. Device 20 includes MEMS based actuators 21-23 that are individually actuable to displace a corresponding support or post 21a-23a. Posts 21a-23a provide support for and are coupled to a deformable layer 25 that can be deformed when any one of posts of 21a-23a are displaced. Deformable layer 25 is overlaid with a reflective material to form reflective surface 26 that is also deformed with deformable layer 25.

When any one of MEMS devices 21-23 are actuated, the corresponding portion of layer 25 is displaced, producing a corresponding displacement of reflective surface 26. With the deformation of reflective surface 26, the reflective properties of device 20 change with respect to beam geometry, so that an incident beam is no longer reflected in a uniform direction, as would be the case when surface 25 and reflective surface 26 are not deformed. By actuating the various MEMS devices 21-23, the incident beam is either dispersed or uniformly reflected, thereby providing a modulation of an incident beam. MEMS devices 21-23 are constructed with arrays of compliant electrostatic actuator electrodes 21b-23b. Each compliant electrostatic actuator electrode 21b-23b supports a corresponding pedestal 21a-23a, so that pedestals 21a-23a are displaced when electrodes 21b-23b are correspondingly displaced.

While device 20 may be composed of a number of MEMS devices including MEMS devices 21-23, a deformable reflective surface need not be realized on a microlevel, but can be orders of magnitude larger or smaller, depending upon the technology used. That is, the present invention is not predicated strictly on the use of MEMS devices, but is contemplated as encompassing large structures with dimensions on the order of fractions of a meter or multiple meters. The same principals described herein with respect to MEMS based devices can be exploited on much larger or smaller scales to achieve the objects of the present invention. The following discussion focuses on MEMS based devices as a convenient reference for illustrating the invention, as permitting illustration of various fabrication techniques.

Using MEMS device 22 as an exemplary actuator, deformation of surface 26 to achieve modulation of a reflected beam is described in greater detail, with the description being applicable to other MEMS devices 21, 23. MEMS device 22 includes a fixed electrode 22c arranged over a substrate 27. An insulation layer 28 can be provided between fixed electrode 22c and substrate 27 to isolate fixed electrode 22c for individual actuation. A voltage applied between compliant electrode 22b and fixed electrode 22c causes compliant electrode 22b to deform. In FIG. 2, compliant electrode 22b is illustrated as being displaced toward fixed electrode 22c. However, compliant electrode 22b may also be displaced away from fixed electrode 22c with the application of an appropriate voltage between compliant electrode 22b and fixed electrode 22c. Post 22a communicates the mechanical deflection of compliant electrode 22b to flexible layer or membrane 25 to deform reflective surface 26, thereby influencing an incident beam wavefront to obtain a reflected beam that is modulated.

Figure 3:
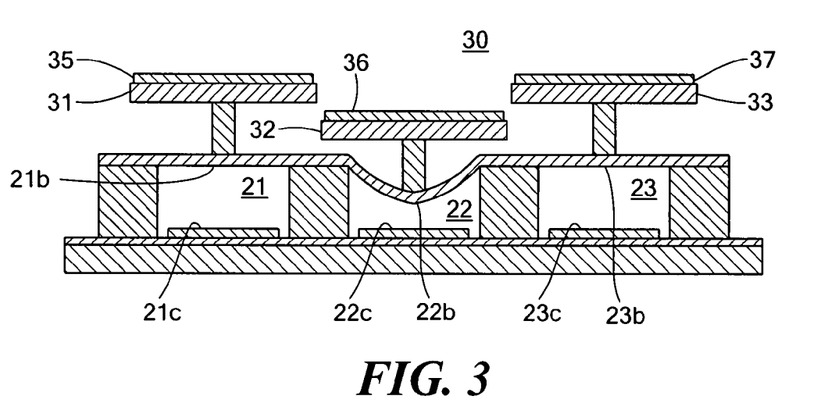
FIG. 3 is a cross-sectional side view of a deformable reflective surface according to an embodiment of the present invention.

Referring now to FIG. 3, another embodiment of the present invention is illustrated as device 30. Device 30 is constructed similarly to device 20, and similar components are identified with the same reference designators as device 20 for convenience. Device 30 has independent support layers 31-33, each of which is overlaid with a reflective coating 35-37, respectively. Because layers 31-33 are independent of each other, a reflective surface formed by reflective coatings 35-37 can be formed to be either substantially completely reflective in a uniform direction or to disperse an incident beam, or can modify an incoming wavefront to be reflected in a number of different directions. MEMS devices 21-23 may be operated independently to provide different angles of reflectance for an incident beam, such as by applying different voltages between corresponding compliant electrodes 21b-23b and fixed electrodes 21c-23c, respectively. Alternately, actuation of MEMS devices 21-23 can be coordinated to provide, for example, a diffractive return beam with multiple orders or modes.

Devices 20 and 30 illustrated in FIGS. 2 and 3 can be very lower power devices since a small voltage may be used to cause the deflection of the compliant electrodes. In addition, devices 20 and 30 can be in a relaxed state with little or no power applied to maintain the state, such as uniform reflectance or dispersive reflectance. Devices 20 and 30 may also be used in retroreflectors to return an incident beam to a source and modulate the returned beam to provide a communication link in a retroreflector configuration. The deformable reflective surface provided by devices 20, 30 can act as a uniform reflective surface or mirror, that maximizes the amounts of light that is retroreflected, or can act as a deformed or non-uniform reflective surface that dramatically reduces the amount of light that is retroreflected to the beam source. One of the two states of maximized retroreflected light or substantially reduced retroreflected light can be configured to use little or no power in maintaining the state. In addition, the retroreflector need not be based on planar reflective surfaces, but can have a number of surface contour shapes that can be modified in accordance with the present invention to prevent or permit a retroreflected beam transmission to provide a modulated communication link.

Retroreflectors formed with the deformable surfaces illustrated in FIGS. 2 and 3 can be applied in many different applications, including active optical receivers and point to point communication. For example, a retroreflector equipped with a photodetector can be used to sense a characteristic of incoming light and provide corresponding modulation for the retroreflector. One type of application that may be used with a retroreflector having a photodector is an "identify friend or foe" response (IFF) for use in military situations, for example, where a photodector, controller and retroreflecting modulator can respond to an incident optical beam to prevent friendly fire incidents.

Another application involving point to point communication may involve the use of a microphone or other type of sensor and a modem to encode speech or other forms of data. A remote beam source can interrogate the device, which may contain a photosensitive receiver. This type of point to point communication does not require a large amount of power at the location of the retroreflector since the incident beam supplies enough power to permit a modulated return beam to the source or to another receiver. For example, voice communication between a person on the ground and an overhead aircraft may be obtained with an eye safe laser beam that has enough power to produce a retroreflected and modulated beam that can be modulated with a microphone, modem and modulated retroreflector device used by the person on the ground. The voice data can be encoded through the microphone and modem and used to modulate the incident beam to return a communication signal to the receiver of the plane.

According to an embodiment of the present invention, the modulated retroreflector device returns a modulated beam to a beam source based on changing the shape of a reflective surface in the retroreflector. The retroreflection modulation can be accomplished through spatial phase or amplitude modulation of the incident wave front. A control signal may be used to deform or change the shape of the reflective surface to permit modulation of the reflected wave front. Actuation of the devices used to change the shape of the reflective surface can be accomplished with a number of different techniques, including electrostatic, thermal, magnetic, piezoelectric, magnetoresistive and other transduction techniques.

Figure 4:
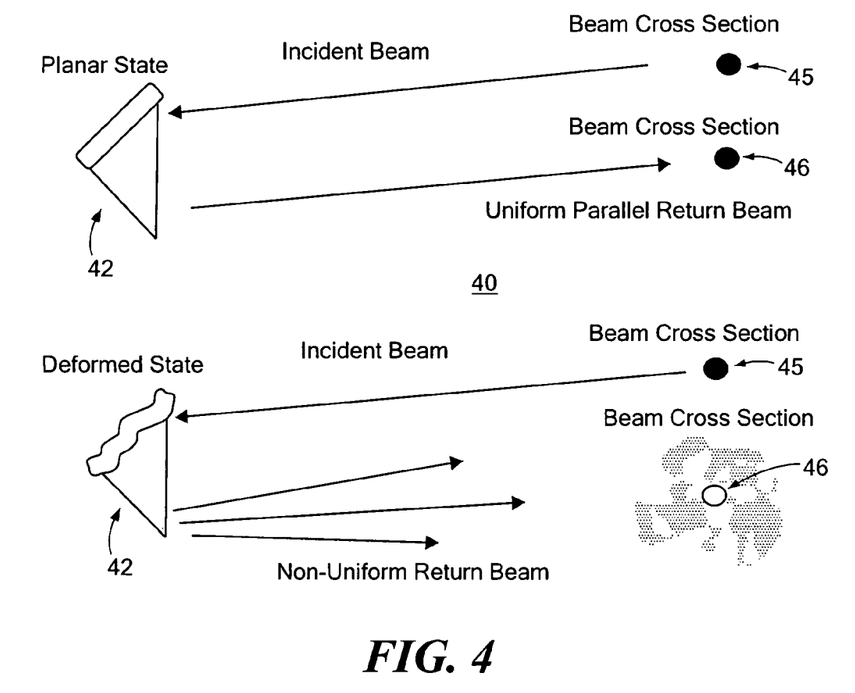
FIG. 4 is a diagram illustrating operation of a retroreflector in accordance with the present invention.

Referring now to FIG. 4, a diagram 40 illustrates operation of a retroreflector 42. Retroreflector 42 is illustrated as a corner cube retroreflector, but any other type of retroreflector may be used, including a single reflective surface or cat's eye retroreflector. A beam source 45 is directed at retroreflector 42, and a return beam is either substantially reflected back to receiver 46, or dispersed so that very little reflected light is directed to receiver 46. When retroreflector 42 has a modulated reflective surface that is in a substantially planar state, retroreflector 42 behaves substantially as a simple corner cube retroreflector, returning a reflected beam in a direction substantially parallel to the incident beam. When the modulated surface of retroreflector 42 is modified to change its shape, retroreflector 42 provides non-uniform retroreflected light. The non-uniform retroreflected light is diffracted or scattered in various directions so that receiver 46 receives very little reflective light. In the embodiment illustrated in diagram 40, the incident light is not absorbed by retroreflector 42, but rather redirected or scattered through distortion of the modulation surface by an amount sufficient to disturb the planarity of the return wave front. According to an aspect of the present invention, a large degree of scattering of reflected light is achieved by generating a surface topography that is out of plane by approximately 1% of the wave length of the incident light. Additional scattering, or greater signal to noise ratio may be obtained through greater distortion of the modulated reflective surface in retroreflector 42.

A significant difference between the modulated retroreflector of the present invention and previously modulated retroreflectors is observed with the deformation of a reflective surface, rather than a tilting of a reflective surface to change an aspect of a planar reflective surface. That is, by deforming a reflective surface rather than tilting a planar reflective surface, the retroreflector device according to the present invention obtains a significantly lower power solution with smaller actuation displacement to permit inherently faster retroreflector devices to be constructed. A typical characteristic of a conventional modulated retroreflector device is that speed is scaled along with the size of an actuated area. By dividing the actuation of a reflective surface spatially across the surface, modulation of an incident beam is faster and more effective than previous modulated retroreflector constructions. The simplicity of the construction of the modulated retroreflector according to the present invention also permits a reduced cost while providing a high modulation contrast ratio, i.e., on intensity divided by off intensity of the retroreflected beam.

Figure 5:
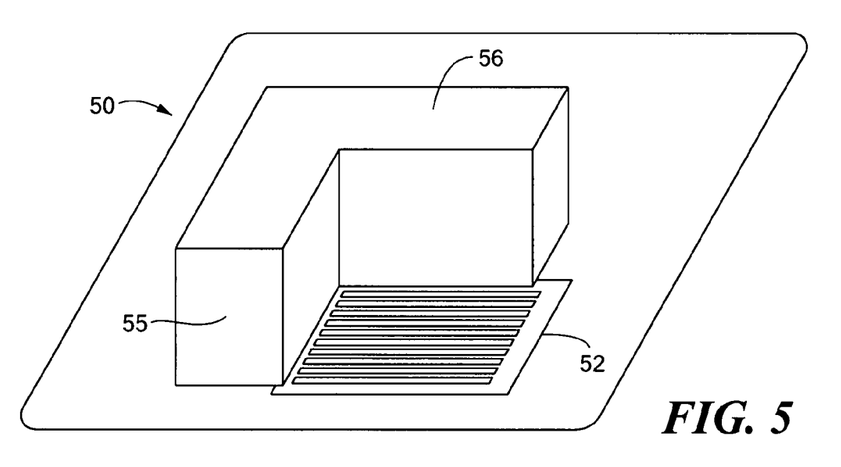
FIG. 5 is a perspective view of a corner cube retroreflector according to the represent invention.

Referring to FIG. 5, an embodiment of a corner cube modulated retroreflector 50 is illustrated. Retroreflector 50 is constructed very simply with a MEMS package 52 and two orthogonal mirrors 55, 56 mounted to MEMS package 52. Orthogonal mirrors 55, 55, 56 are also orthogonal to MEMS package 52, and can be inexpensive, simple reflective surface. MEMS package 52 can be constructed using conventional surface micromachining processes.

Figure 6A:
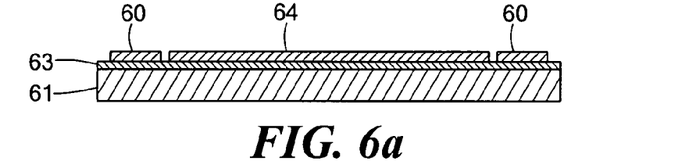
FIGS. 6a-6f are a series of cross-sectional side views illustrating the formation of a MEMS device with a reflective surface in accordance with an embodiment of the present invention.
Figure 6B:
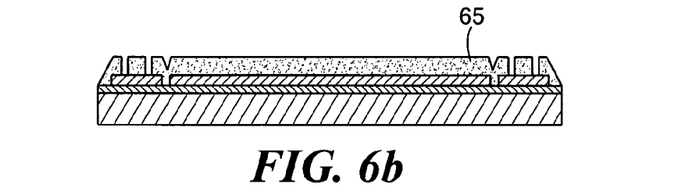
Figure 6C:
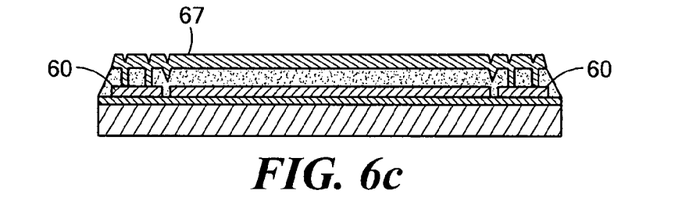

Referring now to FIGS. 6a-6f, a number of process steps used to form a MEMS based device 62 with a deformable reflective surface is illustrated. In FIG. 6a a silicon substrate 61 overlaid with a silicon nitride layer 63 is overlaid with a patterned polysilicon layer 64. Polysilicon layer 64 forms an electrically conductive layer, while silicon nitride layer 63 is electrically insulative. Polysilicon layer 64 is patterned to form isolated portions 60 that can be used as conductive pads or paths. FIG. 6b illustrates the deposition of an oxide layer, such as phosphorous silica glass (PSG), which is subsequently patterned to form openings communicating with portions of polysilicon layer 64 to permit the formation of actuator anchors. In FIG. 6c another polysilicon layer 67 is deposited over oxide layer 65 to form a compliant electrode. Polysilicon layer 67 is in electrical contact with portions 60 of polysilicon layer 64 to permit a means for the application of a voltage to polysilicon layer 67.

Figure 6D:
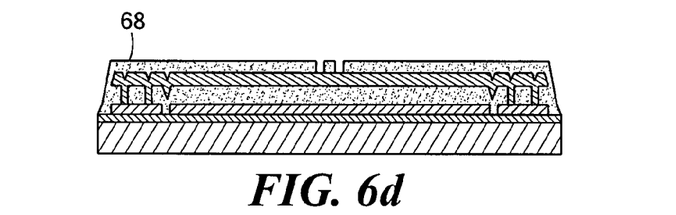
Figure 6E:
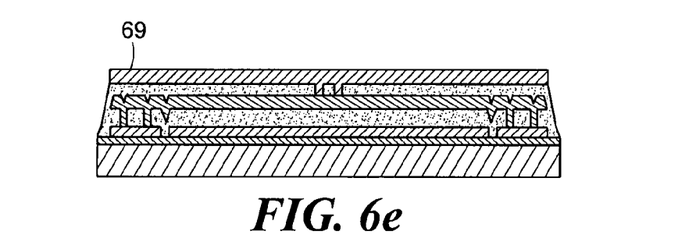
Figure 6F:
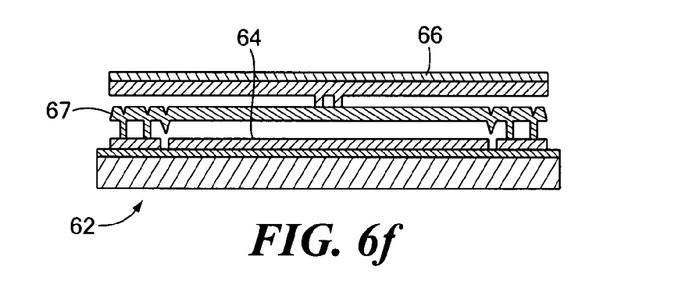

In FIG. 6d, another oxide layer 68 is deposited over polysilicon layer 67 and treated to obtain a polished or uniform surface. Oxide layer 68 is then patterned and etched to form openings in communication with polysilicon layer 67. In FIG. 6e, another polysilicon layer 69 is deposited on top of oxide layer 68, with polysilicon material in openings of oxide layer 68 forming posts for supporting polysilicon layer 69 on top of polysilicon layer 67. Subsequently, the structure illustrated in FIG. 6e is exposed to an oxide etch process to remove oxide layers 65 and 68, whereby the MEMS structure is released and free to move. In FIG. 6f, the released device is processed to flatten a surface of polysilicon layer 69 prior receiving a reflective material, such as a metal deposition, such as gold, for example. The finished MEMS device 62 provides a deformable reflective surface that can be deformed through an actuation of the MEMS device formed in part by polysilicon layers 64 and 67. When polysilicon layers 64 and 67 receive a differential electrical potential, polysilicon layer 67 is displaced to move reflective surface 66 and change the shape of reflective surface 66.

Figure 7A:
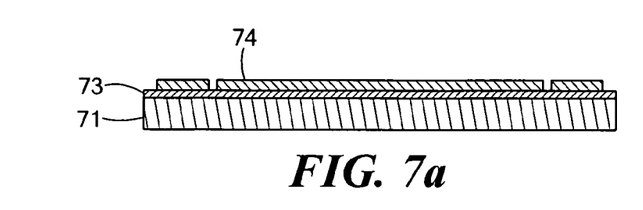
FIGS. 7a-7d are cross-sectional side views of a series of steps for forming a MEMS based reflective surface according to an embodiment of the present invention.
Figure 7B:
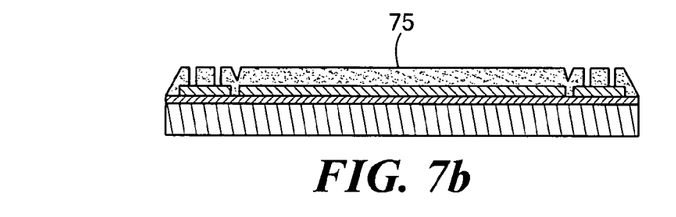
Figure 7C:
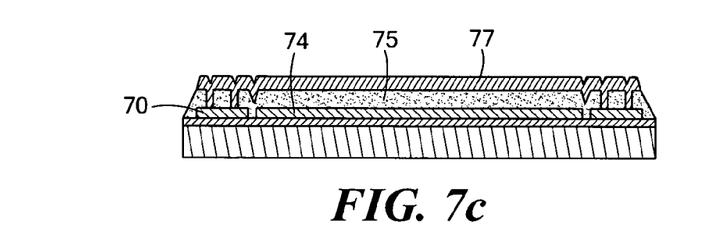
Figure 7D:
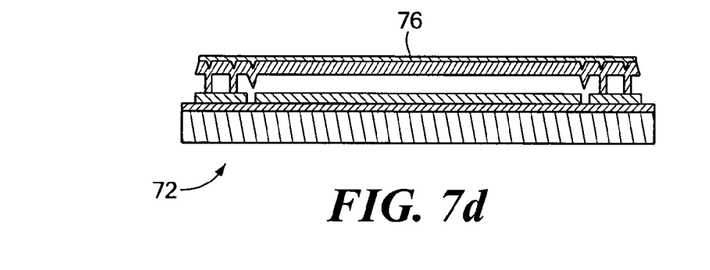

Referring now to FIGS. 7a-7d, an alternate process for forming a MEMS based deformable reflective device 72 is illustrated. The process illustrated in 7a-7c is substantially similar to that illustrated in FIG. 6a-6c, where a polysilicon layer 77 is formed over an oxide layer 75, atop a polysilicon layer 74, with polysilicon layer 77 contacting polysilicon layer 70. The structure illustrated in FIG. 7c is simply exposed to an oxide etch to remove oxide layer 75 and free polysilicon layer 77 to permit relative movement of polysilicon layer 77. Polysilicon layer 77 can then be processed to obtain a flat top surface, on top of which is deposited a reflective material 76, such as a metal, like gold, for example. MEMS based reflective device 72 is formed with a simplified process in comparison to MEMS based reflective device 62 and has the potential to reduce cost of the resulting device due to the simplicity of manufacture. In the case of device 72, reflective surface 76 deforms when polysilicon layer 77 is displaced through electrostatic forces, so that the shape of reflective surface 76 is modified. In contrast, device 62 operates by displacing reflective surface 66 in a substantially linear direction determined by the displacement of polysilicon layer 67 of MEMS device 62.

Figure 8A:
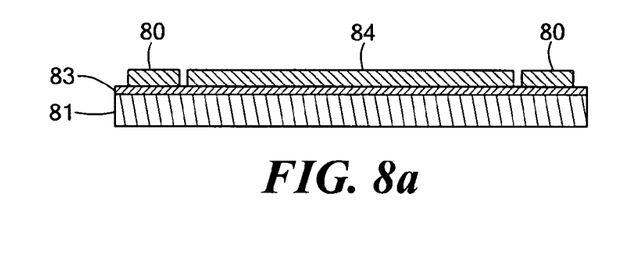
FIGS. 8a-8c are cross-sectional side views of a series of steps for forming a MEMS based reflective surface according to an embodiment of the present invention.
Figure 8B:
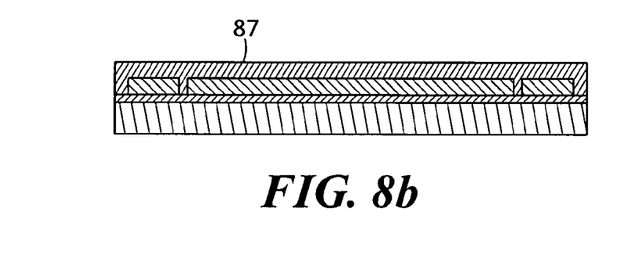
Figure 8C:
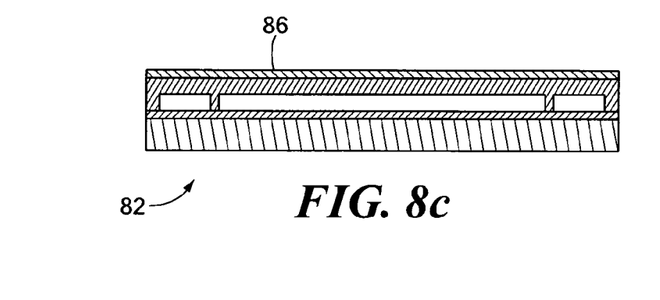

Referring now to FIGS. 8a-8c, another process for forming a deformable reflective device 82 is illustrated. In FIG. 8a, an oxide layer 84 is deposited over a silicon nitride layer 83 atop a silicon substrate 81. Oxide layer 84 is patterned to form through openings defining portions 80. A polysilicon layer 87 is deposited atop oxide layer 84 and contacts silicon nitride layer 83 to receive support. Polysilicon layer 87 forms a compliant electrode for MEMS based deformable reflective device 82. In FIG. 8c, polysilicon layer 87 is released from oxide layer 84 with an oxide etch. Polysilicon layer 87 may then be processed to be polished or flattened to have a uniform aspect. A reflective material 86 is deposited atop polysilicon layer 87 to form a reflective surface. Reflective material 86 may be a metal such as gold and has the properties of being flexible and highly reflective.

Reflective device 82 shown in FIG. 8c is constructed to be simple in manufacture and operation by eliminating several components or processing steps and taking advantage of the properties of existing layers, such as substrate 81. For example, silicon substrate 81 can act as a uniform ground plane for electrostatic actuation of MEMS based device 82. Each compliant electrode formed with polysilicon layer 87 can be coupled to a separate voltage source for manipulating MEMS device 82. In an exemplary embodiment, alternating rows of compliant electrodes formed with polysilicon layer 87 can be connected to a common voltage that is switchable for actuation of the alternating rows. The remaining alternating rows of compliant electrodes formed with polysilicon layer 87 can be coupled to a separate voltage source for manipulating MEMS device 82.

In another exemplary embodiment, alternating rows of compliant electrodes formed with polysilicon layer 87 can be connected to a common voltage that is switchable for actuation of the alternating rows. The remaining alternating rows of compliant electrodes formed with polysilicon layer 87 can be connected to another common potential, such as ground. This simplistic construction permits the device, when energized, to act as a diffraction grating with a period equal to the row spacing. Upon application of a voltage to the alternating rows, the substantially planar surface of device 82 is switched into a multilevel planar reflector to permit retroreflective modulation, for example.

The devices illustrated in 6a-6f, 7a-7d and 8a-8c are all low power devices due to the reduced actuation energy used by the low capacitance electrostatic actuation. The low capacitance reduces the power used to drive the mirror, so that power usage becomes primarily determined by switching speed of the device. The inventive devices described above use power on a scale that is linear with the speed of operation of the device, and when placed in an array, have a power usage that scales linearly with area. In addition, the efficiency, or modulation ratio, is large because the device can be transformed rapidly from a highly reflective planar continuous mirror state to a highly deformed state. In accordance with an exemplary embodiment, a modulation ratio of 500:1 has been observed for the deformable reflective surface devices constructed in accordance with the present invention.

Among the applications in which the deformable reflective in accordance with the present invention may be successfully used, communication applications with retroreflector devices provide further opportunities for addressing optical or RF communication specifications. For example, a laser communication system with a modulated retrorefelector in which the retroreflector has a deformable reflective surface can be provided in a compact, low power device. In addition, sensor networks can be developed with modulated retroreflectors in accordance with the present invention to produce sensory information in response to an interrogating laser beam signal, for example. The modulated retroreflector in accordance with the present invention provides secure communication without the use of pointing and tracking specifications or requirements. In addition, a modulated retroreflector permits long range communication based on the beam source power to achieve optical or RF communication. Some long-range applications with communication channels provided by modulated retroreflectors include identify friend or foe, soldier-aircraft voice uplink and sensor networks in military usage.

Figure 9:
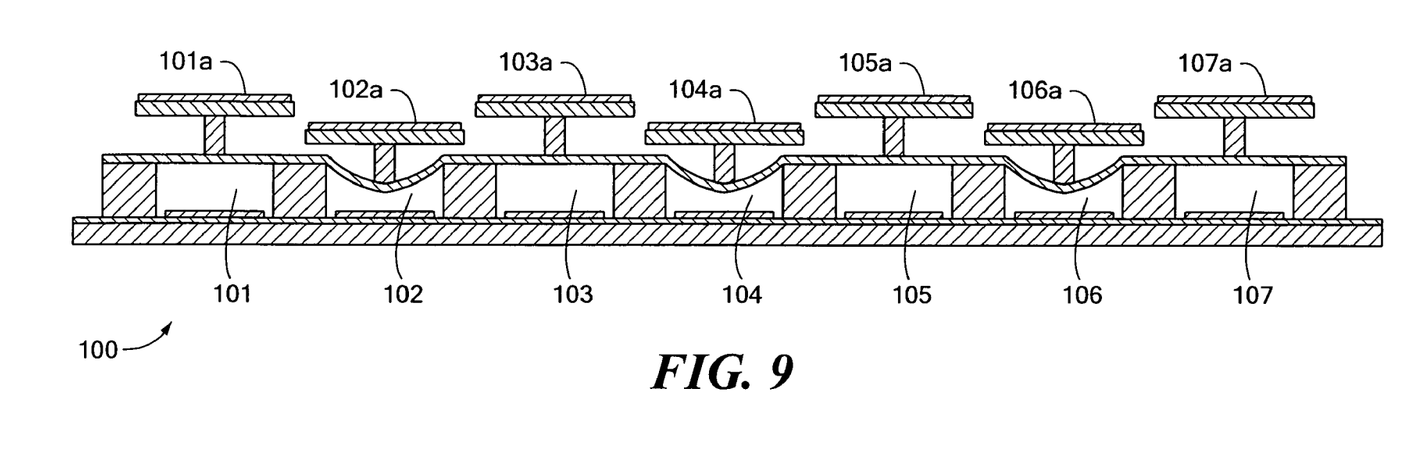
FIG. 9 is a cross-sectional side view of a MEMS based deformable reflective surface according to an embodiment of the present invention.

Referring now to FIG. 9, a MEMS based deformable reflective surface is illustrated generally as device 100. Device 100 includes alternating MEMS structures 101, 103, 105 and 107 that are maintained at a particular planar level to achieve a diffractive reflective surface when alternating MEMS devices 102, 104, 106 are actuated or are in unpowered state. That is, MEMS devices 101-107 can be made to have a substantially uniform reflective surface, or a diffractive reflective surface when reflective surfaces 102a, 104a and 106a are out of plane with reflective surfaces 101a, 103a, 105a and 107a. Reflective surfaces 102a, 104a and 106a can be maintained in the state shown in FIG. 10, either through the application of an electrical potential, or when no electrical potential is applied between the electrodes of the corresponding MEMS devices. The alternating levels of reflective surfaces of 101a-107a permits device 100 to act as a diffractive reflective surface, so that an incident beam is reflected in two discrete directions.

Figure 10:
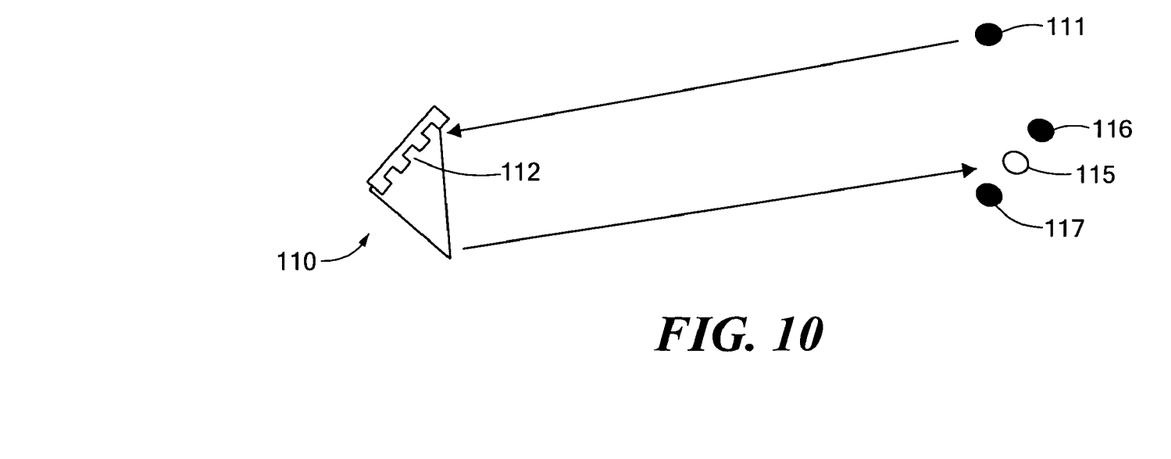
FIG. 10 is a diagram illustrating operation of a retroreflector including a deformable surface illustrated in FIG. 9.

Referring to FIG. 10, a MEMS based diffractive reflective surface is illustrated in use with a retroreflector 110. Beam source 111 is incident on diffractive reflective surface 112, which produces a reflective beam with very little energy in a zeroeth order 115, and a majority of energy in higher orders 116, 117. This type of modulated retroreflector 110 can be used to selectively channel information to a zeroeth order 115 or higher orders 116, 117, based on operation of diffractive reflective surface 112. For example, zeroeth order 115 can receive a particular set of information when diffractive reflective surface 112 is substantially planar and higher orders 116, 117 can receive another set of information when diffractive reflective surface 112 is made to be a diffractive reflector. Information may be carried from beam source 111, or modulated within the different modes of diffractive reflection or planar reflection.

Figures 11, 12:
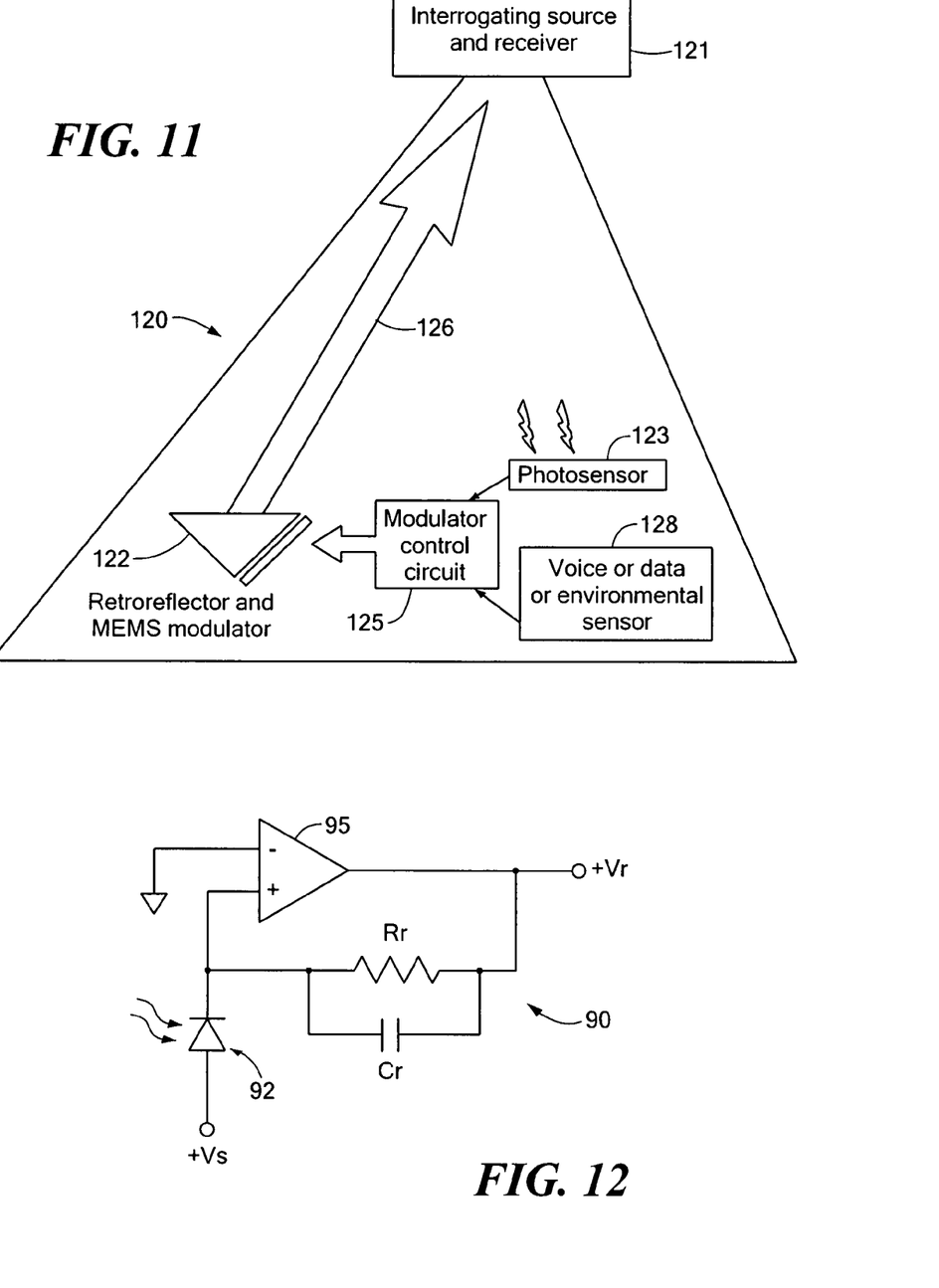
FIG. 11 is a block diagram of a retroreflector communication system according to an embodiment of the present invention.
FIG. 12 is a circuit diagram for an embodiment of the present invention.

Referring now to FIG. 11, a diagram 120 illustrating an embodiment of the present invention is illustrated. Diagram 120 shows a beam source and receiver 121 that provides an incident beam to retroreflector 122 and sensor 123. While sensor 123 is illustrated as being a photosensor to receive an optical signal, sensor 123 can also be in the form of an RF sensor, or any other type of long distance communication medium sensor. Sensor 123 is coupled to a modulator control circuit 125 that influences the operation of retroreflector 122 to provide a modulated signal 126 to receiver 121. Modulator control circuit 125 is also coupled to a voice or data environmental sensor 128, which can take such forms as a microphone, temperature sensor, pressure sensor, image sensor and so forth. The data from sensor 128 is provided to modulator control circuit 125 to contribute to forming a modulation signal applied to retroreflector 122 to obtain modulated retroreflected beam 126.

Source 121 can provide a beam detected by sensor 123 that is itself modulated for conveying instructions or communication data to the retroreflector system. The information decoded by sensor 123 can be used to influence the modulation provided by modulator control circuit 125 to adapt or change the modulation applied to retroreflector 122. For example, an incident beam applied to sensor 123 can be used to turn on encryption or select other types of encoding in the communication channel. A number of other applications are available as well, such as "identify friend or foe," interrogate a sensor network, and so forth.

A typical application for a modulated retroreflector involves a telescopic guide for a source beacon to guide the source beacon to a retroreflector. The telescopic guide can measure the energy in a returned or retroreflected signal and guide the source beacon to a location closer to the retroreflected beam to increase the energy of the beam that is returned to the source beacon. One technique for assisting the telescopic guide and aligning the source beacon and the retroreflector is to permit the retroreflector to send a chirp signal to a detector that is adjacent to the source beacon.

Referring now to FIG. 12, the application described in FIG. 11 that uses a modulated retroreflector and involves the use of a photo sensor may use a power circuit 90. Circuit 90 uses a powerless photovoltaic sensor 92 coupled with the modulated retroreflector of the present invention to produce a compact low power device that can received an incoming optical signal and modulate the retroreflector in conjunction with additional modulation information, for example. That is, the incoming interrogating laser beam can contain information that can be picked up by powerless photovoltaic sensor 92 and processed by a circuit 90 to supply power to the modulated retroreflector. Circuit 90 is operable to respond to an incoming beam to provide a voltage Vr applied to the retroreflector system. A source voltage Vs is switched to an op-amp 95 by sensor 92 based on an incoming beam being detected. The use of powerless photovoltaic sensor 92 permits the modulated retroreflector to act as a "wake up" type device that operates only when interrogated with an incoming beam. The returned beam can be provided as a secure modulated signal directed to the source of the interrogating beam. This type of device can be constructed at a very low cost, so that large numbers can be used for a given application and all easily interrogated for returning a large amount of data such as in a sensor application.

Figure 13:
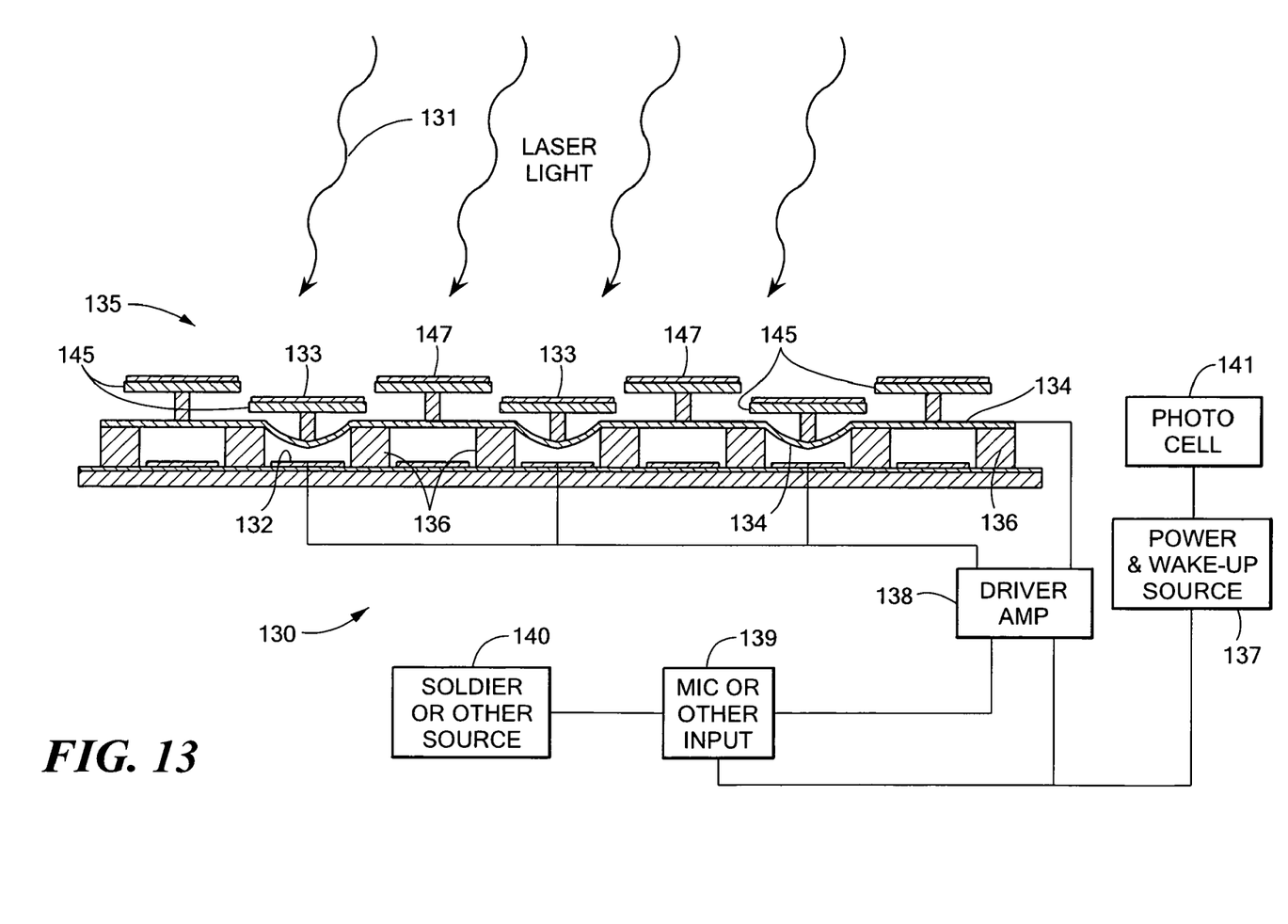
FIG. 13 is a block diagram illustrating operation of a deformable reflective surface according to an embodiment of the resent invention.

Referring now to FIG. 13, another embodiment of a deformable reflective surface for use in a retroreflector system is illustrated generally as device 130, Device 130 reflects incident beam 131 in a specular or distorted form with the deformation of the reflective surface of device 130. Deformation of the reflective surface of device 130 is typically accomplished through electrostatic forces, by raising a differential voltage between fixed conductors 132 and flexible conductors 134, which are supported by insulator structures 136. Mirror segments 133 are coupled to flexible conductor 134 in a physical relationship, such as by being attached to flexible conductor 134. The application of a differential voltage to conductors 132, 134 induces a depression of flexible conductor 134 based on connections provided to a driver amp 138. Driver amp 138 is coupled to an input device 139 which collects data or information from source 140, such as voice data or sensor data. A power and wake up device or circuit 137, such as is illustrated as circuit 90 in FIG. 12, supplies power to driver amp 138 and input device 139 to permit data to be input from source 140 to modulate deformable reflective surface 135. Power and wakeup device 137 may take the form of a power circuit that is activated with a photocell 141, which makes power and wakeup device 137 active upon receipt of beam 131. Accordingly, device or system 130 is inactive until photocell 141 detects incident beam 131, upon which power and wake up device 137 becomes active to permit operation of deformable reflective surface 135, which can then be modulated based on signals provided by input device 139 and driver amp 138.

Although deformable reflective surface 135 is illustrated as having independently movable reflective segments 133, deformable reflective device 130 can be realized with a single membrane overlaid on supports 145 to provide a continuous deformable reflective surface. In addition, while deformable reflective device 130 is illustrated as having every other reflective segment positioned out of plane with non-actuated reflective segments, it should be apparent that each reflective segment can be operated independently to provide a variable planar surface to disperse incident light upon reflection. Also, while every other reflective segment is illustrated in deformable reflective device 130 as being non-actuated, it should be apparent that every other reflective segment can be actuated in an opposite direction, such that while some reflective segments 133 are displaced downward towards fixed conductor 132, other reflective segments 147 can be displaced upward, or away from fixed conductors 132, for example. In such an operation, the differentiation between the two different reflective planar levels can be made more distinct to further improve signal discrimination between the substantially uniform reflective state and the deformed reflective state. Moreover, by permitting alternating sets of reflective segments to operate in unison, a number of different states can be achieved, such as when one alternating set of reflective segments are non-actuated and another set are actuated, or when both sets are actuated in opposite directions, for example. The embodiment illustrated in system 130 helps to conserve power in power and wakeup device 137, since it does not become active until incident beam 131 is applied to photocell 141 to permit power to be supplied to system 130. Power and wakeup device 137 can act as an alert to an individual or device that can input data into system 130, such as sensor data or voice data.

Although the present invention has been described in relation to particular embodiments thereof, other variations and modifications and other uses will become apparent to those skilled in the art from the description. It is intended therefore, that the present invention not be limited by the specific disclosure herein, but to be given the full scope indicated by the appended claims.

What is claimed is:

1. A modulated retroreflector, comprising:
 a reflective surface of the retroreflector formed to permit a change in a shape of the reflective surface;
 an electromechanical element underlying and coupled to the reflective surface and operable to change a shape of the reflective surface;
 a signal coupled to the electromechanical element and operable to actuate the electromechanical element to change a shape of the reflective surface, thereby modulating the retroreflector.

2. The retroreflector according to claim 1, further comprising another reflective surface arranged with the shape changing reflective surface to contribute to retroreflection by the retroreflector.

3. The retroreflector according to claim 2, wherein the retroreflector is a corner cube retroreflector.

4. The retroreflector according to claim 1 wherein the electromechanical element is one of a plurality, the plurality being arranged in an array, whereby selective actuation of the elements produces a diffractive reflective surface.

5. The retroreflector according to claim 1, wherein the electromechanical element further comprises an actuator for actuating the electromechanical element based on the signal.

6. The retroreflector according to claim 5, wherein the actuator operates by one or more of electrostatic, thermal, magnetic, piezoelectric or magnetoresistive actuation.

7. The retroreflector according to claim 1, wherein the reflective surface further comprises a flexible reflective layer.

8. The retroreflector according to claim 1, wherein the reflective surface is uniformly reflective or dispersively reflective in dependence upon an actuation state of the electromechanical element.

9. The retroreflector according to claim 1, further comprising a plurality of states for the electromechanical element, at least one state resulting from actuation of the electromechanical element and at least another state resulting from non-actuation of the electromechanical element, one of the states being maintained without consuming energy.

10. The retroreflector according to claim 1, wherein the electromechanical element further comprises:
 a pair of silicon electrodes opposing each other; and
 at least one of the electrodes being compliant, such that the application of a potential difference between the pair of electrodes urges the at least one compliant electrode toward or away from the other electrode.

11. The retroreflector according to claim 10, further comprising supports coupled to the compliant electrode for spacing the at least one compliant electrode from the other electrode.

12. The retroreflector according to claim 10, further comprising a reflective surface support coupled between the at least one compliant electrode and the reflective surface for transmitting displacement of the at least one complaint electrode to the reflective surface.

13. The retroreflector according to claim 1, further comprising a sensor device operable to detect an incident beam and influence the signal coupled to the electromechanical element.

14. The retroreflector according to claim 13, further comprising a power source coupled to the sensor device, and operable to be activated to supply power to the modulated reflective surface in dependence upon operation of the sensor device and an incident beam.

15. The retroreflector according to claim 1, wherein the reflective surface is segmented.

16. A retroreflective device, comprising:
 a reflective surface of the retroreflective device; and
 an electromechanical element underlying and coupled to the reflective surface and operable in response to a control signal to deform a portion of the reflective surface, whereby the reflective surface assumes a different shape.

17. The device according to claim 16, wherein the electromechanical element further comprises an actuator responsive to the control signal and operable to actuate the electromechanical element to cause a portion of the electromechanical element to be displaced.

18. The device according to claim 17, wherein the actuator operates by one or more of electrostatic, thermal, magnetic, piezoelectric and magnetoresistive actuation.

19. The device according to claim 16, further comprising a sensor device operable to influence the control signal in response to an incident beam.

20. The retroreflective device according to claim 16, wherein the reflective surface is segmented.

21. A method of operating a retroreflector composed of a reflective surface, comprising:
    maintaining the reflective surface in a first shape to obtain a first reflective characteristic; and
    deforming the reflective surface with an actuator underlying the reflective surface to obtain a second reflective characteristic different from the first reflective characteristic.

22. The method according to claim 21, further comprising actuating an electromechanical element to maintain or deform the reflective surface.

23. The method according to claim 22, further comprising sensing an incident beam and influencing actuation of the electromechanical element based on sensing the incident beam.

24. The method of claim 21, further comprising moving a segment of the reflective surface out of alignment with the reflective surface using the actuator.

25. A micro-electromechanical modulated reflective surface, comprising:
    a reflective surface formed to permit a change of surface shape;
    a micro-electromechanical actuator underlying and coupled to the reflective surface and operable to influence the reflective surface to contribute to changing a shape of the reflective surface; and
    a control signal input connected to the actuator to actuate the actuator to change a shape of the reflective surface, whereby the reflective surface is modulated based on a value of a signal applied to the control signal input.

26. A micro-electromechanical modulated reflective surface, comprising:
    a reflective surface formed to permit a change of surface shape;
    a micro-electromechanical actuator coupled to the reflective surface and operable to influence the reflective surface to contribute to changing a shape of the reflective surface; and
    a beam sensor operable to detect an incident beam and generate a signal in dependence on a characteristic of the beam to influence the actuator.

* * * * *

UNITED STATES PATENT AND TRADEMARK OFFICE
CERTIFICATE OF CORRECTION

PATENT NO. : 7,929,195 B2  Page 1 of 1
APPLICATION NO. : 11/791146
DATED : April 19, 2011
INVENTOR(S) : Thomas G. Bifano It is certified that error appears in the above-identified patent and that said Letters Patent is hereby corrected as shown below:

Column 4, line 27, delete the word "has";

Column 4, line 33, "connected a" should read --connected to a--;

Column 5, line 23, "represent" should read --present--;

Column 5, line 46, "resent" should read --present--;

Column 9, line 9, "55, 55, 56" should read --55, 56--; and

Column 9, line 41, "prior receiving" should read --prior to receiving--.

Signed and Sealed this
Twelfth Day of June, 2012

David J. Kappos
*Director of the United States Patent and Trademark Office*